United States Patent [19]
Guot

[11] Patent Number: 5,350,348
[45] Date of Patent: Sep. 27, 1994

[54] MODULAR MACHINE FOR MAKING CARDBOARD PACKAGES

[76] Inventor: Bernard Guot, Le Port Albert, 49460 Feneu, France

[21] Appl. No.: 964,411

[22] Filed: Oct. 21, 1992

[30] Foreign Application Priority Data

Oct. 21, 1991 [FR] France .................. 91 12982

[51] Int. Cl.⁵ .................. B31B 1/14; B31B 1/25; B31B 49/02
[52] U.S. Cl. .................. 493/34; 493/324; 493/354; 493/477; 493/479
[58] Field of Search .................. 493/1, 2, 30, 34, 324, 493/354, 477, 478, 479

[56] References Cited

U.S. PATENT DOCUMENTS

| | | | |
|---|---|---|---|
| 3,815,380 | 6/1974 | Esmay | 64/4 |
| 4,304,501 | 12/1981 | Gordon et al. | 403/359 |
| 4,527,788 | 7/1985 | Masuda | 493/324 |
| 4,618,342 | 10/1986 | Borel | 493/30 |
| 4,968,292 | 11/1990 | Takeda | 493/477 |
| 5,123,887 | 6/1992 | Shimura | 493/34 |

FOREIGN PATENT DOCUMENTS

| | | |
|---|---|---|
| 0440808 | 8/1991 | European Pat. Off. . |
| 2141520 | 12/1984 | United Kingdom . |
| 2233066 | 1/1991 | United Kingdom . |

*Primary Examiner*—William E. Terrell
*Attorney, Agent, or Firm*—Poms, Smith, Lande & Rose

[57] ABSTRACT

A modular machine for making cardboard packages having a plurality of modules. A controlling automatic indexing device is provided which cooperates with a length of shaft and blocking means attached to each module for stopping the length of shaft at a predetermined indexing angular position. Thus, when the machine is stopped in order to change or clean the rotary members of the modules, each length of shaft of each module is stopped in the same position of the cycle and remains at its angular position during separation of the modules.

13 Claims, 4 Drawing Sheets

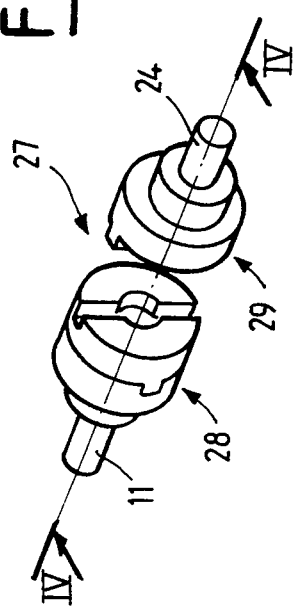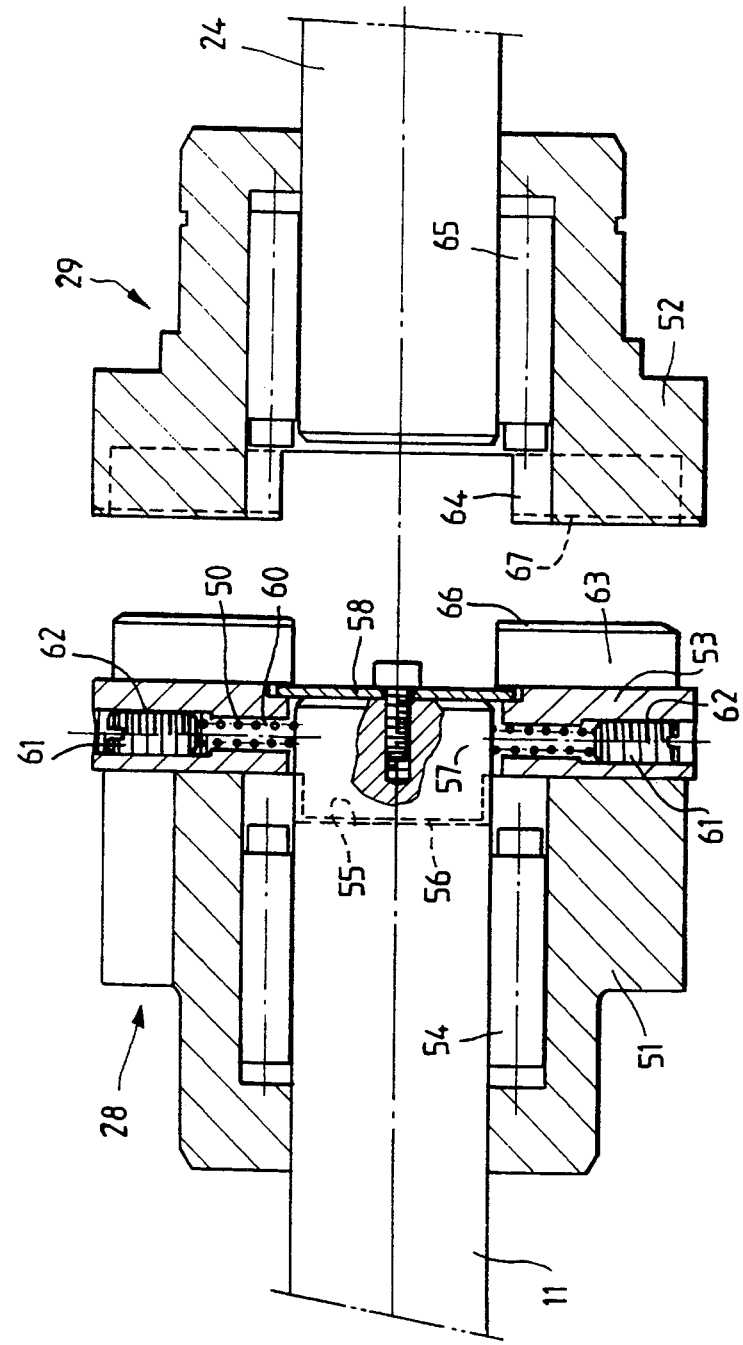

MODULAR MACHINE FOR MAKING CARDBOARD PACKAGES

The present invention relates to a modular machine for making packages out of cardboard, wood, plastic, . . . , such as boxes, trays, punnets, etc.

BACKGROUND OF THE INVENTION

Such machines are known and comprise modules that are organized to perform specialized functions, for example: a feeder module, one or more printer modules, at least one slotter and scorer module, and/or at least one cutter module. These modules are displaceable along guide elements secured to the ground and they are suitable for being locked to one another in the alignment laid down.

The rotary means in each module that participate in performing the function of that module are integral with driven gearing that projects from the module and meshes with driving gearing which is set back in the adjacent module. The driving gearing is connected via complex moving parts to the rotary means of said adjacent module that participate in performing the function thereof. Said driving gearing of the first-mentioned module meshes continuously with the driven gearing thereof.

The known apparatus as defined above suffers from major drawbacks relating to gear meshing, and can only be really effective if the gearing is properly lubricated and is put accurately into engagement when the modules are moved towards each other and locked together.

Unfortunately, in order to be able to mesh, the gearing must project from housings provided therefor, and it is then inevitable that lubricant will drip, in particular from the driven gearing since that is the gearing which projects. Whatever sealing means may be implemented, lubricant escapes and dirties the modules and the ground, and sometimes also the packages and the rotary members that engage them and process them.

In addition, meshing is never perfect since it depends, in particular, on the modules pressing properly against each other, on their respective heights coinciding, and on the cleanness of the guide means on the ground which can often become clogged with lubricant, dust, cardboard waste, etc. Under such conditions, teeth may be damaged, slack may occur that is prejudicial to proper performance of each treatment operation, and also to the accuracy and the linking of the successive treatments performed by the machine.

Finally, those known modules are noisy and are detrimental for personnel operating them.

British patent No. 2 233 066 described a machine of this type but in which improvements are provided. In particular, the transmissions transmitting rotary motion from one module to the next do not operate by meshing but are replaced by lengths of shaft that are normally in alignment parallel to the direction in which the modules are moved towards and away from one another. The driving gearing and the driven gearing in each module is omitted and replaced by a claw type coupling, which includes male teeth on one length of shaft and female teeth connected via fluting to an adjacent length of shaft.

To ensure that the angular relationship between shafts is conserved when modules are moved apart and together, the teeth in each coupling are capable of engaging in a single mutual angular relationship only by having teeth that vary in pitch and in width. In addition, a spring is provided between the female set of teeth and the corresponding fluted length of shaft. Under such circumstances, to couple together the lengths of shaft in two adjacent modules, it is necessary to bring the set of teeth into face-to-face contact with the moving module continuing to apply pressure against the fixed module while the length of shaft having the female set of teeth rotates slowly: then, once the two sets of teeth are in proper angular relationship, the spring causes them to engage.

That type of coupling suffers from the drawback of requiring the driving shaft to be caused to rotate slowly in order to ensure that the corresponding coupling engages. Consequently, whenever modules are brought together, the driving shaft is caused to rotate numerous times, and this means that the modules must be brought together while the line of modules is empty, since otherwise lack of synchronization between the various lengths of shaft would inevitably lead to cardboard jamming.

In addition, each module contains the same gearing as conventional modules except for the sole difference of said gearing being driven from the corresponding length of shaft via a pair of conical gear wheels. Under such conditions, the same drawbacks arise as those mentioned for prior modules: oil leaks, noise, play and wear.

An object of the present invention is to remedy all of these drawbacks of the above-mentioned known machines, in particular by omitting all lubrication means (pumps, ducting, housing, . . .) and thus the risks of oil leaks, and by transmitting motion from one module to the next extremely accurately with coupling taking place automatically, safely, reliably, and without any risk of angular offsets between the modules, and simultaneously considerably attenuating noise.

SUMMARY OF THE INVENTION

In the invention, and in conventional manner, each module contains moving parts for driving rotary members that perform the function of the module, each module being guided in translation along rails parallel to the geometrical axis of the line of modules and being suitable for being moved towards or away from the preceding module, each module being also fitted at its ends and on either side with complementary portions of locking devices each suitable for co-operating with the complementary locking portion of the adjacent module, the moving parts of each module including a length of shaft extending parallel to the geometrical axis of the line of modules and provided at its ends with complementary portions of a coupling device which is put into operation or taken out of operation by being moved in translation parallel to said geometrical axis, with the length of shaft in the initial module of the line being coupled to a rotary drive device.

For the above-mentioned object, and in accordance with the invention, the initial length of shaft in the driving module co-operates with a controlling automatic indexing device for stopping all of the moving parts of the module under consideration in a predetermined position of its cycle which corresponds to an indexing angular position of said length of shaft, while each of the following lengths of shaft of the driven modules co-operates with a controlled indexing device receiving the indexing command from the controlling indexing device to stop said lengths of shaft in the same indexing angular position as the controlling length of shaft when the moving parts of said driven modules are all stopped by the line of shaft lengths in the same predetermined position of the cycle as the moving parts of the driving module.

In a particularly advantageous embodiment, the controlling indexing device comprises firstly a rotary portion or "target" which is connected to the moving parts of the initial module to rotate through one revolution when a complete cycle thereof is performed, and secondly a stationary reader such as the reader of a shaft encoder, an electrical contact, a photoelectric cell, a proximity detector, . . . , connected to the rotary drive device and to the controlled indexing devices to stop them. The controlled indexing device includes a disk secured to the corresponding length of shaft and having a notch suitable for co-operating with a moving finger moved by an actuator connected to the reader of the controlling indexing device.

In addition, each of the lengths of shaft is connected by a device having at least one cog belt to the above-mentioned rotary members that perform the function of the corresponding module.

Furthermore, in order to enable each length of shaft to co-operate directly with an angle take-off having complementary gear wheels or with a cog belt, at least one cog belt connects each of the lengths of shaft to a gear box coupled to the above-mentioned rotary members that perform the function of the corresponding module.

In any event, at least one of the coupling devices may be an Oldham coupling comprising two end plates and an intermediate plate, with coupling being achieved therebetween by two complementary diametrical tongue and groove sets which are mutually orthogonal; the intermediate plate is held axially prisoner at the free end of the length of shaft on which one of the end plates is mounted, is free to move radially in all directions relative to said end, and is resiliently centered thereon.

Various other characteristics and advantages of the invention also appear from the following detailed description.

BRIEF DESCRIPTION OF THE DRAWINGS

Embodiments of the invention are described by way of example with reference to the accompanying drawings, in which:

FIG. 3 is a perspective view showing a first embodiment of one of the coupling devices;

FIG. 4 is a section on a larger scale on line IV—IV of FIG. 3; and

DETAILED DESCRIPTION

Figure 1:
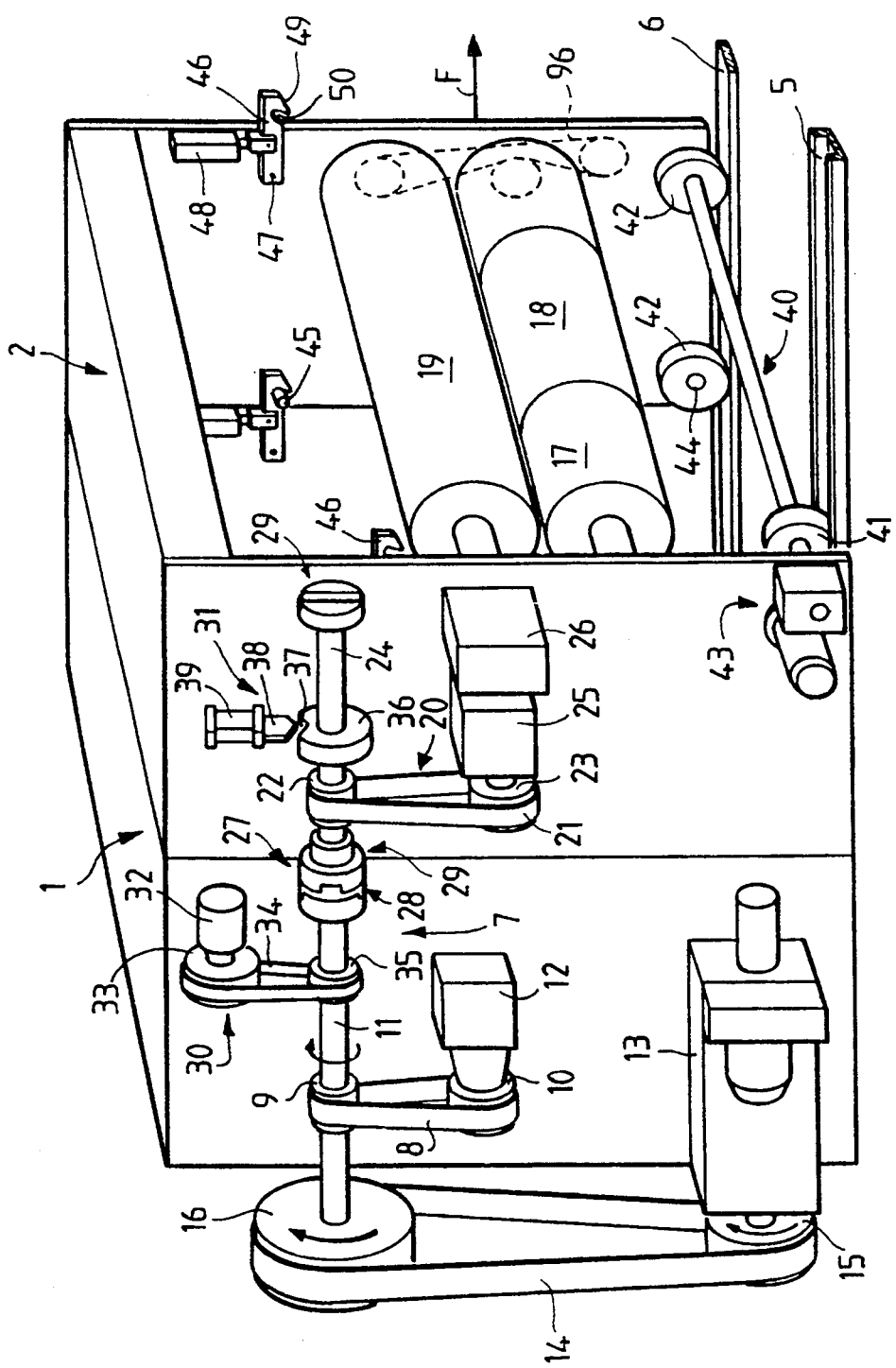
FIGS. 1 and 2 are diagrammatic perspective views that run on from one to the other and that show one embodiment of a line of modules in a machine of the invention.
Figure 2:
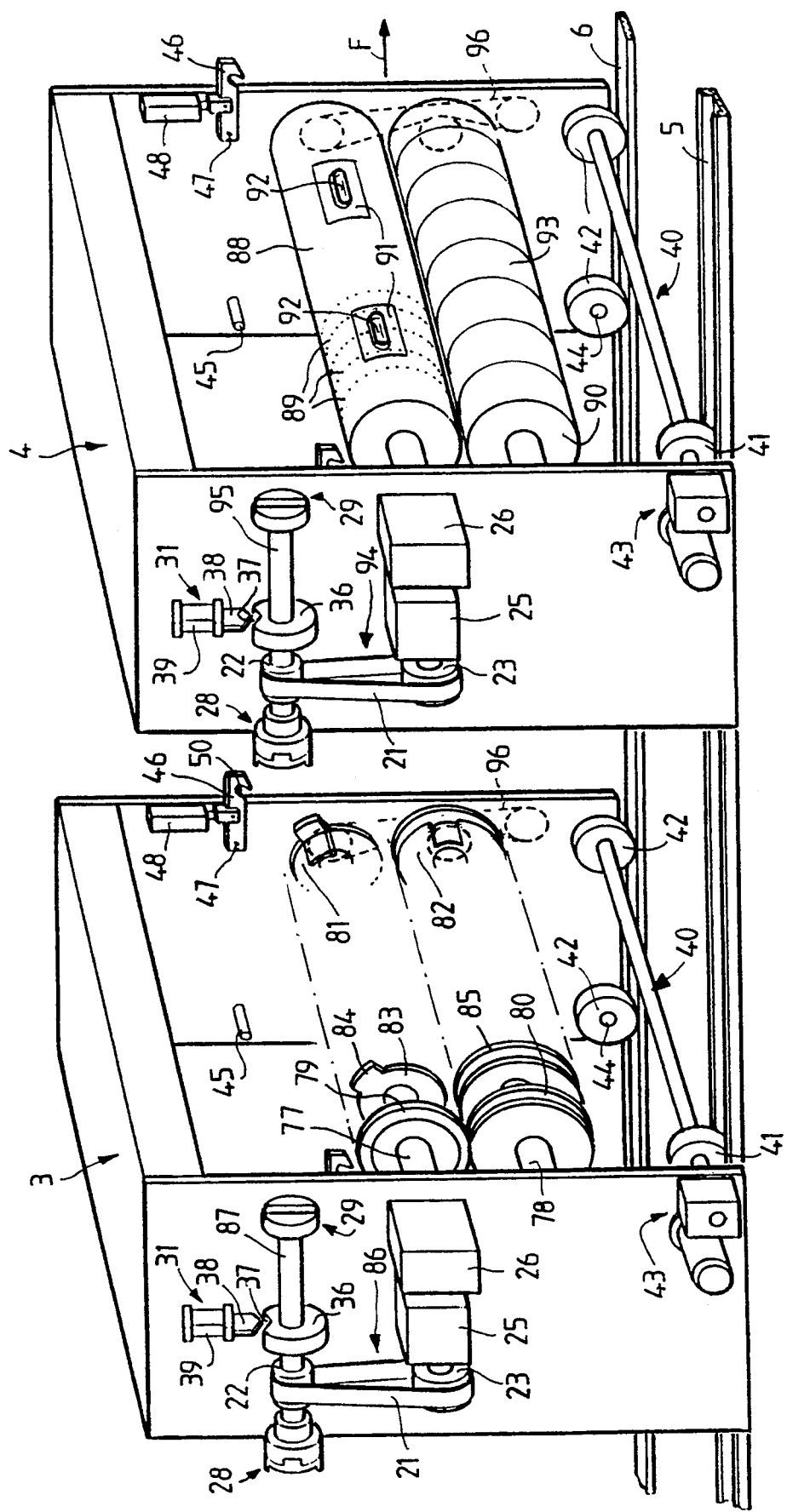

As can be seen in FIGS. 1 and 2, the modular machine for making cardboard packages comprises modules 1 to 4 that are displaceable in translation along rails 5 and 6 and that are capable of being selectively united or separated.

In the example shown, the machine comprises a line of modules beginning with a feeder module 1 whose rotary members serve to dispense each card blank (not shown) to the following station and to position each blank so that subsequent operations are performed in the right places.

These members are actuated by internal moving parts that are in turn driven by a transmission 7 comprising an endless cog belt 8 passing over a driving pulley 9 and a driven pulley 10 respectively integral with a length of shaft 11 and an angle take-off 12.

The length of shaft 11 extends parallel to the rails 5 and 6, and consequently to the direction F in which the modules 2 to 4 move away from each other or towards each other. It is supported by bearings that are not shown.

At its free end, the length of shaft 11 is drivingly engaged to a motor and gear box unit 13, e.g. by means of a belt transmission 14 passing over two pulleys 15 and 16 secured respectively on the outlet shaft of the unit 13 and on the length of shaft 11.

In the same example shown in the drawing, the machine then comprises a printer module 2 in which the following are rotatably mounted: a plate-carrying cylinder 17 fitted with a printing plate 18, a blanket-carrying cylinder 19, and various other cylinders. All of these cylinders are actuated by internal moving parts that make use of cog belts to avoid noise and lubrication. These moving parts are driven by a transmission 20 comprising an endless cog belt 21 travelling over a driving pulley 22 and a driven pulley 23 respectively secured to a length of shaft 24 and to an adjustment differential 25 coupled to an angle take-off 26.

The length of shaft 24 is in alignment with the length 11 of the module 1 and it is supported by bearings that are not shown. These two lengths of shaft 11 and 24 are connected to each other by a coupling device 27 whose complementary portions 28 and 29 (FIGS. 1 and 3) are separable to enable the modules 1 and 2 to be moved apart, said complementary portions being organized to center themselves automatically and to unite when the two modules are moved together.

To identify a specific point in each of the repetitive cycles of machine operation and corresponding to a particular angular position of the initial length of shaft 11, e.g. the starting point, a controlling automatic indexing device 30 is provided amongst the moving parts of the initial module 1.

In addition, to stop the following length of shaft 24 of the module 2 at the same angular position as the initial length of shaft 11, when the moving parts of the two modules 1 and 2 are stopped in the same predetermined position of a cycle, a controlled indexing device 31 is provided amongst the moving parts of the driven module 2.

By means of these controlling and controlled indexing devices 30 and 31, it is ensured that the lengths of shaft are stopped at the same angular position in the same zone of a cycle. In other words, if a cycle represents six revolutions of the lengths of shaft 11 and 24, then the indexing devices 30 and 31 enable the moving parts to be stopped at the zero point of the first sector of the six sectors in a cycle.

Naturally, each cycle may correspond to a single revolution of the line of shafts, or to some other (integer or non-integer) number of revolutions.

The initial, controlling indexing device 30 may be constituted by a shaft encoder, an electrical contact, a photoelectric cell, a proximity detector, etc. The rotary portion 32 of said control device is driven by a driven pulley 33 connected by an endless cog belt 34 to a driving pulley 35 secured to the length of shaft 11. The step-down ratio of the pulleys 33 and 35 is the same as that of the transmission 8 to 10 between the length of shaft 11 and the driven member of the feeder housed in the module 1, such that the rotary portion 32 of the controlling indexing device moves past a stationary reader thereof (not shown) at the same speed as the operating cycle of the module 1.

The controlled indexing device 31 of the module 2 can be of any type providing it stops the length of shaft 24 on receiving a stop signal issued by the stationary reader of the controlling indexing device 30, which signal is generally applied to the motor and gear box unit 13 to stop it as well as the line of lengths of shaft 11, 24, to which it is coupled.

In the example shown, the controlled indexing device 31 is of the mechanical type and is under pneumatic or other control. It comprises a disk 36 secured to the length of shaft 24 and having a V-notch 37 suitable for co-operating with a moving finger 38 moved by a pneumatic actuator 39. Like the braking of the unit 13 and the stopping of other functions in the machine as a whole, feed to the actuator for the purpose of pushing the finger 38 into the notch 37 is under the control of a microcomputer. This pneumatically-controlled mechanical indexing is operative when the modules are separated.

As mentioned above, the controlled indexing device 31 can be of a different type. In particular, it may be constituted by an electromechanical brake controlled by the reader of the controlling indexing device.

In any event, the indexing devices 30 and 31 serve, in particular while the modules 1 and 2 are separated, to keep the lengths of shaft 11 and 24 stationary at the same angular position and in the same position in a cycle. As a result, the machine can be stopped for the purpose of separating modules and then moving them back together again, without it being necessary to empty it of the packages that are being made therein. It is also possible to insert a module without disturbing the cycle.

For displacement purposes, the module 2 includes an axle 40 integral with two wheels 41 and 42. The wheel 41 is guided by the rail 5 which in this case is a channel section bar, and the wheel 42 rests on the rail 6 which in this case is a flat, thereby providing a running track. The axle 40 is driven by a motor and gear box unit 43 fixed on the module 2. Two other wheels 41 and 42 are mounted free to rotate about stub axles 44, are located in front of the axle 40, and are guided along the rails 5 and 6.

If the rails are accurately positioned on the ground, then the module 2 standing thereon via its four wheels 41 and 42 is accurately vertical and bears accurately against the module 1. Under such circumstances, it is merely necessary to secure the modules together automatically and firmly.

To this end, each of the modules 1 and 2 is provided on either side and at each end with respective complementary portions of locking devices. In the example shown, the front complementary portion is constituted by a stationary finger 45 while the rear complementary portion is constituted by a hook 46 pivotally mounted about a stationary axis 47 and moved by an actuator 48. The hook 46 has a sloping cam surface 49 giving access to a locking notch 50, such that when the module 2 moves towards the module 1 and its finger 45 engages the cam surface 49 of the hook 46 in the module 1, said hook is raised, and then the notch 50 thereof locks onto said finger. Under such circumstances, the hooks of a front module lock onto the fingers of a rear module, thereby fixing the two modules together.

On locking, the complementary portions 28 and 29 of the coupling device 27 belonging respectively to shaft lengths 11 and 24 of modules 1 and 2, engage mutually without there being any need to generate rotation in one shaft length relative to the other. This engagement takes place easily providing firstly the indexing devices 31 and 32 hold the shaft lengths 11 and 12 in the same angular position, and secondly the guidance and locking effects are very accurate, and in particular the complementary portions 28 and 29 center each other and engage automatically one relative to the other, taking up positioning errors which, though small, are inevitable.

There follows a description of embodiments of a coupling device 27 suitable for being put into service and taken out of service by translation parallel to the geometrical axis of the line of modules.

In the first embodiment shown in FIGS. 3 and 4, the coupling device is an Oldham coupling, comprising two end plates 51 and 52 and an intermediate plate 53.

In the example shown, the plate 51 is coupled via an expandable sleeve 54 to the driving length of shaft 11. It defines a diametrical groove 55 in which a tongue 56 of the intermediate plate 57 is slidably received. The intermediate plate 53 has a bore 57 fitted loosely onto the free end of the length of shaft 11 which has a washer 58 fixed on the end thereof and bearing slidably against the intermediate plate 53.

In addition, four springs 59 are received in holes 60 of said intermediate plate 53 and are interposed between the free end of the length of shaft 11 and plugs 61 screwed into tapped outlets 62 of said holes 60.

The intermediate plate 53 is thus mounted in such a manner as to be free to move radially in any direction relative to the length of shaft 11, while being resiliently centered relative thereto.

The free face of the intermediate plate 53 defines a diametrical groove 63 suitable for slidably receiving a tongue 64 projecting from the other end plate 52. The groove 63 is orthogonal to the tongue 56.

The plate 52 is coupled via an expandable sleeve 65 to the free end of the driven length of shaft 24. When the lengths of shaft 11 and 24 are in alignment, moving the module 2 towards the module 1 (and thus moving complementary portion 29 towards complementary portion 28), causes the intermediate plate 53 to center itself automatically on the driven plate 52 (by cooperation between chamfers 66 and 67 on the sides of the groove 63 and the tongue 64), and said plates couple by said tongue 64 engaging in said groove 63.

Figure 5:
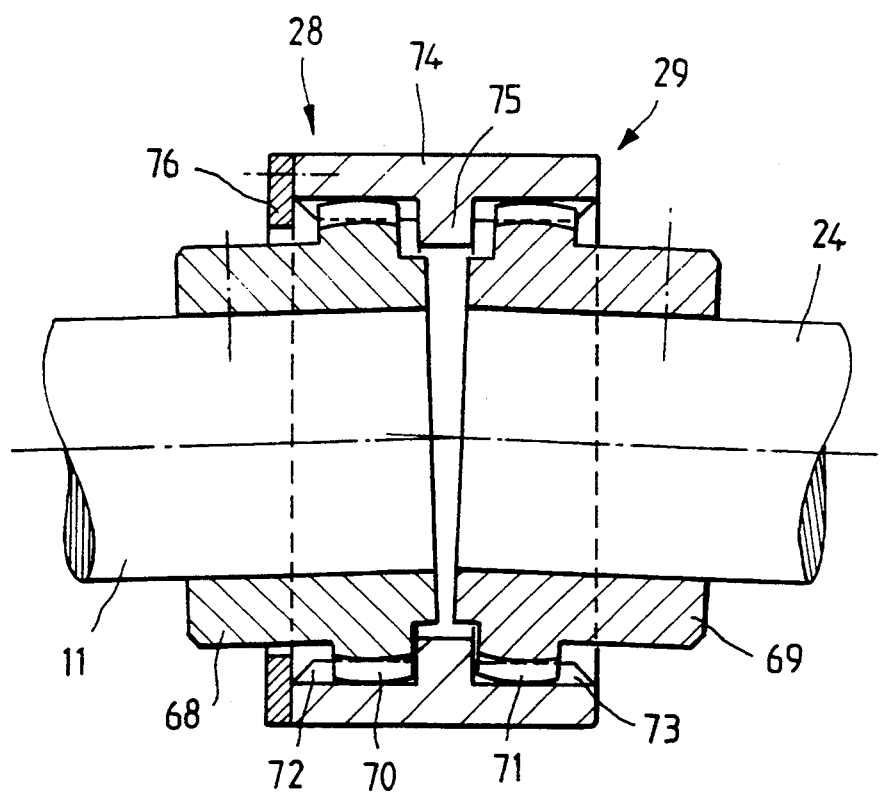
FIG. 5 is a view analogous to FIG. 4 showing a second embodiment of a coupling device.

In a second embodiment shown in FIG. 5, the coupling device comprises two sleeves 68 and 69 which are coupled by any appropriate means to respective shaft lengths 11 and 24. These sleeves have rounded outside teeth 70 and 71 for meshing with complementary inside teeth 72 and 73. The inside teeth are cut, shaped, or molded inside a ring 74 on opposite sides of an annular partition 75 therein.

The ring 74 is loosely held prisoner on the driving sleeve 11 by means of a washer 76 applied to and fixed on the end of said ring and surrounding the sleeve 68 with considerable clearance.

Because of the rounded shape of the teeth, the centering and the mutual engagement of the complementary portions 28 and 29 of the coupling device takes place automatically and easily when the modules 1 and 2 are moved towards each other and in spite of the inevitable inaccuracies in guidance and in locking.

A third embodiment of the coupling device is not shown but is described briefly below. It comprises an electromagnetic clutch having a first plate that contains an excitation winding connected to slip rings, and fixed on one of the lengths of shaft, and having a second plate suitable for closing the magnetic field and fixed on the other length of shaft, the slip rings being connected to an electrical power supply device that is controlled by the stationary reader of the controlling indexing device 30. The first plate is integral with a centering cone suitable for co-operating with a conical recess guided in the second plate and biased by a spring. The recess and the cone are positioned so as to ensure centering before the plates become too close together.

Other modules may be associated with the above modules 1 and 2.

In the example shown in the drawings, the line of modules comprises, downstream from the printer module 2, a slotter and scorer module 3 commonly called a slotter, followed by a cutter module 4.

FIG. 2 shows that the slotter 3 includes two tool-carrying shafts 77 and 78 that face each other and that act together. Thus, the shaft 77 is fitted at one of its ends with a single trimmer disk 79 co-operating with a pair of disks 80 on the shaft 78 and forming a matrix enabling the cardboard to be cut along a continuous straight line, and at its other end it includes a tab-cutting notcher disk 81 that co-operates with a matrix disk 82 to cut the cardboard along a zig-zag line defining a tab. In addition, the shaft 77 is fitted in its intermediate portion with three notcher disks 83 whose projecting sectors 84 co-operate with pairs of disks 85 that form matrices for cutting slots or notches in the cardboard between flaps that constitute the sides of the packaging to be made.

In addition to the slotting shafts 77 and 78, the module includes scoring shafts (not shown in the drawing) situated ahead of the preceding shafts. These scoring shafts are fitted with male and female scoring wheels that form grooves in the cardboard running between them at locations where folds are to be made.

All of these cylinders are moved by internal moving parts making use of cog belts 96 to avoid noise and lubrication. These moving parts are driven by a transmission 86 identical to the transmission 20 of the module 2 and consequently comprising a length of shaft 86 fitted at its ends with complementary portions 28 and 29 of a coupling device 27 and in between the complementary portions, with a controlled indexing device 31. The module 3 is also fitted with the above-mentioned locking devices 45 to 48 and guide means 40 to 43.

FIG. 2 also shows that the cutter module 4 includes a tool-carrying cylinder 88 pierced by numerous holes 89 and co-operating with a cylinder 90. Slabs of wood 91 integral with cutting tools 92 are mounted on the cylinder 88 and serve, for example, to cut out handles in the packaging. Polyurethane plates 93 are fixed on the cylinder 90 and receive the cutting edges of said tools.

The cylinders 88 and 90 are preceded by driving shafts (not shown in the drawing).

These cylinders and shafts are moved by internal moving parts making use of cog belts 96 to avoid noise and lubrication. These moving parts are driven by a transmission 94 identical to the transmission 20 of the module 2 and consequently comprising a length of shaft 95 fitted at its ends with complementary portions 28 and 29 of a coupling device 27 and fitted therebetween with a controlled indexing device 31. The module 4 is also fitted with above-mentioned locking devices 45 to 48 and guide means 40 to 43.

The line of modules shown in FIGS. 1 and 2 comprises four modules. Naturally, it could include more modules or fewer modules, and some of the modules could be replicated, e.g. there could be several printer modules 2 if printing is to be performed in a plurality of colors.

The above description shows that the internal moving parts of the modules 1 to 4 include a line of shaft lengths 1, 24, 87, and 95 from which cog belts 8 and 21 take power in parallel for delivery to the rotary members performing the functions of said modules, thereby ensuring that the belts and other transmission members are less stressed than they would be if power were to be distributed in series. As a result motion is transmitted more accurately since play does not accumulate, and in addition wear is very greatly reduced.

Furthermore, the generalized use of cog belts makes it possible to eliminate any slip and to guarantee that a given angular relationship is maintained between driving members and driven members, thereby contributing to operating accuracy. It is important to observe that it is still advantageous for the dynamic linking between the rotary members that perform the various functions of the modules to be via cog belts even when transmission from each length of shaft to said members is achieved via respective pairs of conical gear wheels instead of via cog belts.

In addition, some of the modules may be removed sideways from the line of modules and, optionally, transferred into a parallel line of modules. To this end, in addition to its longitudinal guide means 40 to 43 that co-operate with the rails 5 and 6, each of the modules concerned is fitted with transverse guide means (e.g. using wheels) capable of travelling on transverse rails extending perpendicularly to the main rails 5 and 6.

I claim:

1. A modular machine for making packages from a sheet material comprising:
   a plurality of treatment modules, one of the modules being a driving module and the other modules being driven modules, the modules being separably connected in alignment along a line having a geometrical axis, each module having a first side, a second side, a first end and a second end;
   a plurality of rails mounted parallel to the geometric axis of the line, wherein each module is capable of being guided in translation along the rails towards or away from an adjacent module;
   a plurality of driven module locking devices, each driven module locking device having a first locking portion mounted on the first end of each of the driven modules and a second locking portion mounted on the second end of each of the driven modules, the first locking portion being adapted to cooperate in a locking relationship with the second locking portion of an adjacent driven module;
   a driving module locking device having at least one portion mounted to the first end of the driving module;
   a plurality of rotary members for performing a treatment function, one rotary member being mounted to each module;
   a plurality of driven shafts having a first and second end, one driven shaft being coupled to each driven module and extending parallel to the geometric axis of the line, each driven shaft driving each rotary member in a cyclical, rotating movement;

an initial shaft having a first end and a second end and being mounted to the driving module and extending parallel to the geometric axis of the line, the initial shaft driving the rotary member of the driving module in a cyclical, rotating movement;

a transmitting means connected to each rotary member for transmitting the rotating movement of each shaft to each rotary member;

a plurality of driven coupling devices for coupling the first end of each shaft of each driven module with the second end of each shaft of each adjacent driven module, so that the shafts are aligned by translation of the driven modules respective one another;

a driving coupling device for coupling the first end of the initial shaft of the driving module to an adjacent second end of the shaft of a driven module so that the initial shaft is aligned by translation of the driving and driven modules respective one another;

a rotary drive device coupled to the second end of the initial shaft by an initial transmitting means, the rotary drive device transmitting rotary movement from the rotary drive device to the initial shaft;

a controlling automatic indexing device adapted to cooperate with the initial shaft for stopping the initial shaft and each driven shaft at a predetermined indexing angular position;

controlled indexing devices mounted to each driven module for receiving indexing commands from the controlling automatic indexing device; and a plurality of mechanical blocking means, one mechanical blocking means being coupled to each driven module for blocking the driven shaft at the angular indexing position.

2. A modular machine according to claim 1, wherein the controlling automatic indexing device comprises a rotary portion which is connected to the initial shaft in such a way that one revolution of the rotary portion of the indexing device corresponds to one complete cycle of the rotary member of the driving module, and comprises a stationary member adapted to issue a stop signal for stopping the rotary drive device and for putting the blocking means into a blocking position.

3. A modular machine according to claim 2, wherein the mechanical blocking means of each driven module comprises a disk fixedly mounted on the shaft of the driven module and presenting a notch at a determined angular location corresponding to the indexing angular position, and wherein the blocking means further comprises an actuator connected to the stationary reader of the controlling automatic indexing device and a moving finger controlled by the actuator and adapted to adopt an extended position in which the moving finger cooperates with the notch in order to block the shaft of the driven module.

4. A modular machine according to claim 1, wherein the transmitting means comprise at least one cog belt connecting the shaft and the rotary members of the modules in parallel.

5. A modular machine according to claim 1, wherein the transmitting means of each module comprises a gear box coupled to the rotary members of each module and at least one cog belt connecting the shaft of each module to the gear box in parallel.

6. A modular machine according to claim 1, wherein at least one of the modules comprises at least one cog belt interconnecting the rotary members of at least one module.

7. A modular machine according to claim 1, wherein at least one of the coupling devices is an Oldham coupling comprising two end plates and an intermediate plate, with coupling being achieved therebetween by two complementary diametrical tongue and groove sets which are mutually orthogonal; and wherein the intermediate plate is held axially prisoner at the free end of the length of shaft on which one of the end plates is mounted, is free to move radially in all directions relative to said end, and is resiliently centered thereon.

8. A modular machine according to claim 7, wherein the intermediate plate is resiliently centered on the free end of the corresponding length of shaft by means of at least three helical springs received in radial holes of said end and interposed between said end and plugs screwed into tapped outlets of said holes.

9. A modular machine according to claim 7, wherein the intermediate plate is held captive by the outer driving plate.

10. A modular machine according to claim 9, wherein the intermediate plate has a coupling tongue engaging the driving plate to which it is held captive, and defines a coupling groove for engaging the driven plate from which it can be moved apart.

11. A modular machine according to claim 1, wherein at least one of the coupling devices is of the type having rounded teeth and includes two sleeves with outside rounded teeth fixed on two adjacent lengths of shaft and a ring having two sets of inside teeth, one of the sets of inside teeth being permanently engaged with the outside set of teeth on one of the sleeves to which the ring is held captive in loose manner.

12. A modular machine according claim 1, wherein the plurality of rails comprises a channel section rail parallel to a path and wherein each module includes a driving axle having a pair of wheels, one wheel being guided along the channel section rail, and the other wheel running on a path, the module having two other wheels mounted free to rotate about an axis and at a distance from the wheels on the axle.

13. A modular machine according to claim 1, further including a fixed finger mounted on each module, wherein each locking device includes an actuator and a hook pivotally mounted on one module about a fixed axis and moved by the actuator, the hook being suitable for co-operating with the fixed finger mounted on the adjacent module.

* * * * *

UNITED STATES PATENT AND TRADEMARK OFFICE
CERTIFICATE OF CORRECTION

PATENT NO. : 5,350,348
DATED : September 27, 1994
INVENTOR(S) : Bernard Guiot

It is certified that error appears in the above-indentified patent and that said Letters Patent is hereby corrected as shown below:

On the title page, under item [19], "Guot" should be --Guiot-- and in item [76]

Signed and Sealed this

Thirteenth Day of June, 1995

Attest:

BRUCE LEHMAN

Attesting Officer

Commissioner of Patents and Trademarks